(12) United States Patent
Narayanan et al.

(10) Patent No.: US 12,438,887 B2
(45) Date of Patent: Oct. 7, 2025

(54) NETWORK SECURITY ENFORCEMENT USING FLEXIBLE CLIENT GROUPING AT THE CONTROL PLANE AND DATA PLANE

(71) Applicant: HEWLETT PACKARD ENTERPRISE DEVELOPMENT LP, Spring, TX (US)

(72) Inventors: Santhana Krishnan Narayanan, Bangalore (IN); Raghunandan Prabhakar, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 98 days.

(21) Appl. No.: 18/539,735

(22) Filed: Dec. 14, 2023

(65) Prior Publication Data

US 2025/0119436 A1   Apr. 10, 2025

(30) Foreign Application Priority Data

Oct. 9, 2023   (IN) .............................. 202341067539

(51) Int. Cl.
*H04L 9/40* (2022.01)
(52) U.S. Cl.
CPC ............ *H04L 63/107* (2013.01); *H04L 63/08* (2013.01); *H04L 63/104* (2013.01); *H04L 63/105* (2013.01)

(58) Field of Classification Search
CPC ..... H04L 63/08; H04L 63/104; H04L 63/105; H04L 63/107; H04L 63/101
See application file for complete search history.

(56) References Cited

U.S. PATENT DOCUMENTS 11,070,594 B1 * 7/2021 Marrone ................. H04L 12/66
2024/0414086 A1 * 12/2024 Lu ....................... H04L 12/4641

* cited by examiner

*Primary Examiner* — Benjamin A Kaplan
(74) *Attorney, Agent, or Firm* — Hewlett Packard Enterprise Patent Department

(57) ABSTRACT

Systems and methods are provided for customized grouping of end user devices using a new group identifier tag (GIT) in addition to role-based access (e.g., administrator or guest) and device identifier access (e.g., IP or MAC address). Two components may be implemented at a network access device, including a data plane component and a control plane component. For example, the control plane component may authenticate an end user device, store the MAC and IP addresses for authenticated end user devices, and define access roles for the end user device in the datapath. The data plane component may perform packet processing (e.g., forwarding and policy enforcement) pursuant to previously-defined rules. Whenever a packet arrives at the Network Access Device, the packet is forwarded according to the rules specified by the "role" and GIT present in the entry, allowing for improved processing and scalability of network traffic processing.

20 Claims, 12 Drawing Sheets

| GIT 310 | Role 320 | End User Device Identifier 330 | Credential 340 |
|---|---|---|---|
| 123456 | Employee | 1.0.0.10 | ABC@mail.com |
| 123456 | Guest | 1.0.0.11 | ABC@mail.com |
| 789012 | Employee | 1.0.0.12 | DEF@mail.com |
| 789012 | Guest | 1.0.0.13 | DEF@mail.com |

FIG. 3

| ID 410 | Role 420 | Rule 430 |
|---|---|---|
| 01 | Employee | Allow any source to destination if GIT matches |
| 02 | Employee | Allow data traffic to corporate mail server |
| 03 | Employee | Allow data traffic to Internet |
| 04 | Guest | Allow any source to destination if GIT matches |
| 05 | Guest | Deny data traffic to corporate mail server |
| 06 | Guest | Allow data traffic to Internet |

| GIT 610 | Role 620 | End User Device Identifier 630 | Credential 640 | Device Type 650 |
|---|---|---|---|---|
| 333333 | Block Admin | 2.0.0.3 | Building A | Admin Laptop |
| 333333 | IoT Device | 2.0.0.1 | Building A | Camera |
| 444444 | Block Admin | 2.0.0.4 | Building B | Admin Laptop |
| 444444 | IoT Device | 2.0.0.2 | Building B | Camera |

FIG. 6

| ID 710 | Order 720 | Role 730 | Rule 740 |
|---|---|---|---|
| 01 | 1 | Administrator | Allow any source to destination if GIT matches |
| 02 | 2 | Administrator | Allow data traffic to corporate mail server |
| 03 | 3 | Administrator | Allow data traffic to Internet |
| 04 | 1 | IoT Device | Allow any source to destination if GIT matches |
| 05 | 2 | IoT Device | Deny all other data traffic |

FIG. 7

| GIT 910 | Role 920 | End User Device Identifier 930 | Device Type 940 |
|---|---|---|---|
| 12345 | iot-device-role | 4.0.0.1 | IoT Device |
| 67890 | iot-device-role | 4.0.0.2 | IoT Device |
| 12345 | - | 100.100.100.100 | Vendor Server |
| 67890 | - | 200.200.200.200 | Vendor Server |

FIG. 9

| ID 1010 | Order 1020 | Role 1030 | Rule 1040 |
|---|---|---|---|
| 01 | 1 | iot-device-role | Allow DHCP |
| 02 | 2 | iot-device-role | Allow DNS |
| 03 | 3 | iot-device-role | Allow any source to destination if GIT matches |
| 04 | 4 | iot-device-role | Deny all other data traffic |

Datapath 1050

```
/*sample config object defining a role of iot devices */
    user-role iot-device-role  /* start of definition of user-role config object named "iot-device" */
        allow DHCP  /* sample standard network policies */
        allow DNS   /* sample standard network policies */
        GIT-match allow any  /*GIT based policy to allow any other traffic to only matching vendor
destination */
        deny any  /*policy to deny rest of the traffic */
```

FIG. 10

NETWORK SECURITY ENFORCEMENT USING FLEXIBLE CLIENT GROUPING AT THE CONTROL PLANE AND DATA PLANE

BACKGROUND

Traditional discretionary access-control (DAC) systems implement access control lists (ACLs) to allow authenticated devices to access certain data objects in the network. For example, the ACL could be used for granting or denying write access to a particular file. The ACL can be implemented as a database with individual entries of devices or groups of devices that are permitted to access these data objects.

BRIEF DESCRIPTION OF THE DRAWINGS

The present disclosure, in accordance with one or more various examples, is described in detail with reference to the following figures. The figures are provided for purposes of illustration only and merely depict typical or examples.

FIG. 3 illustrates a memory component of the system for storing a grouping of identifiers to enhance network security of user devices, in accordance with some examples of the disclosure.

FIG. 4 illustrates a memory component of the system for storing role-based rules to enhance network security of user devices, in accordance with some examples of the disclosure.

FIG. 6 illustrates a memory component of the system for storing a grouping of identifiers to enhance network security of user devices, in accordance with some examples of the disclosure.

FIG. 7 illustrates a memory component of the system for storing role-based rules to enhance network security of user devices, in accordance with some examples of the disclosure.

FIG. 9 illustrates a memory component of the system for storing a grouping of identifiers to enhance network security of user devices, in accordance with some examples of the disclosure.

FIG. 10 provide an illustrative datapath entry, in accordance with some examples of the disclosure.

Figure 1:
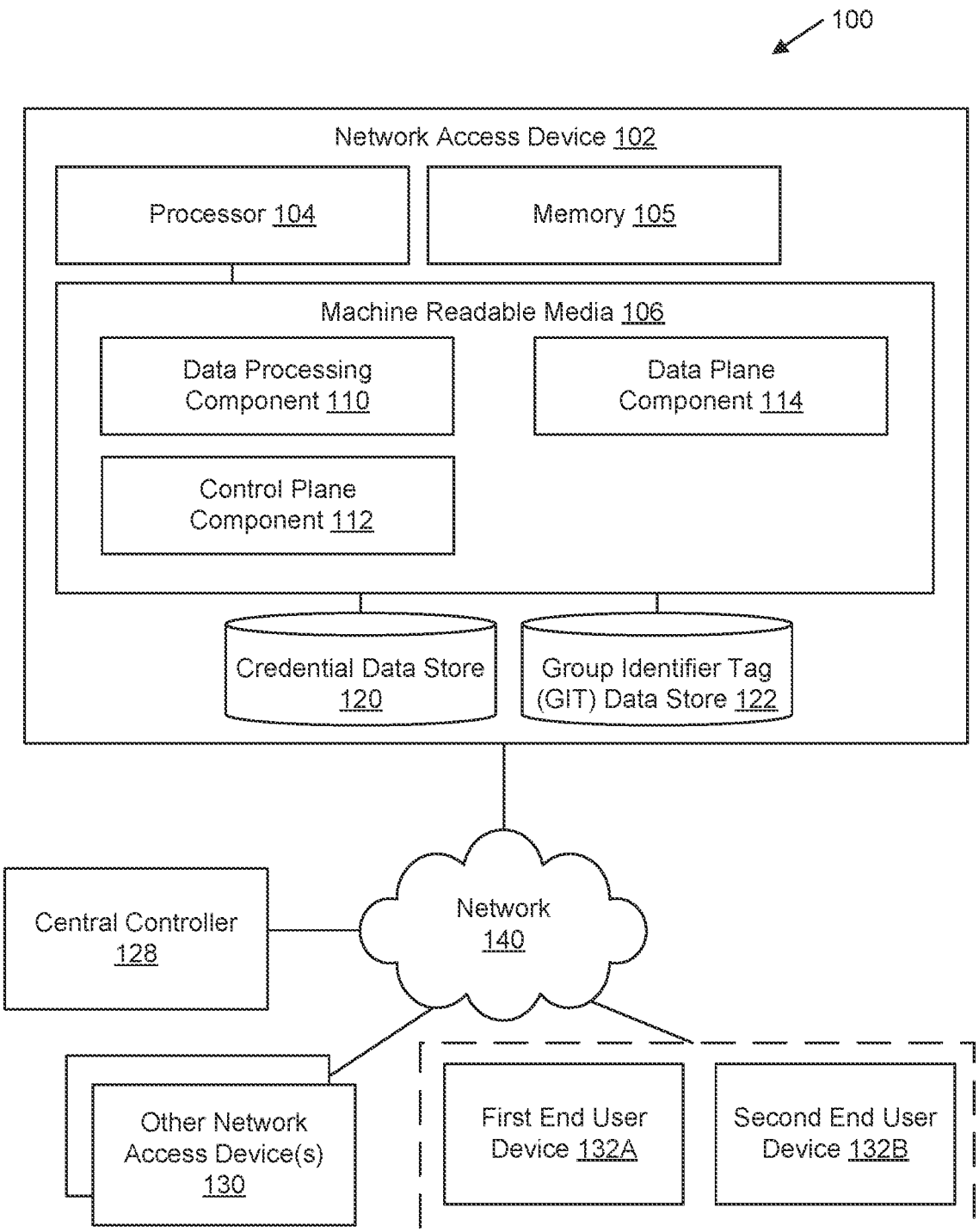
FIG. 1 provides an illustrative network access device in communication with other network access devices and user devices via a network, in accordance with some examples of the disclosure.

The figures are not exhaustive and do not limit the present disclosure to the precise form disclosed.

DETAILED DESCRIPTION

Management and allocation of access control lists (ACL) implemented by traditional discretionary access-control (DAC) systems can be resource-intensive and inefficient in large networks, especially when authorized users connect to the network with multiple devices. For example, an end user device connects to the network and, after authentication, the device is provided access to components of the network based on an assigned "role" pursuant to the role defined in the ACL. A role is a configurable object provided by a network access device which contains a list of rules that govern the access of network resources. The network access device may also have the capability to create multiple roles with different level of privileges (e.g., as defined by a network administrator). The network access device may also have the capability to associate a role to an end-user device and govern the traffic flow from/to the end-user device based on the privileges of the role.

The role defined in the ACL can also specify what data objects resources can be accessed by the device. However, when a first device for a user (e.g., work laptop) has sufficient authentication and security installed on the device and a second device for the user (e.g., IoT or personal mobile device) does not, the network security may be compromised. Different users operating under the same "role" may not be allowed to access each other's data objects.

Additionally, the existing software layer identifies end user devices using the media access control (MAC) address or internet protocol (IP) address and stores the role information for each end user device in the corresponding user entry. There is no existing scheme to map these MAC or IP addresses to ownership information or any other kind of "group" association.

Examples of the disclosed technology implement any logical-based grouping (e.g., by device type, device class, credential, location, operating system, user identifier, or other defined grouping of devices or users). The logical-based grouping may be implemented using at least two components with a Network Access Device (e.g., an access point (AP) or switch), that can analyze a new identifier stored in transmitted data packets, rather than relying on MAC or IP addresses. The two components of the Network Access Device include a data plane component and a control plane component of the Network Access Device. The control plane component may be implemented in software to instruct the data plane component to perform tasks upon receiving the data packet. For example, the control plane component may authenticate an end user device, store the MAC and IP addresses for authenticated end user devices, and define access roles for the end user device in the datapath. The data plane component may be implemented in software or hardware to perform packet processing (e.g., forwarding and policy enforcement) pursuant to the rules defined by the control plane component. The data plane component may analyze each data packet and access data tables that store associations between a particular MAC or IP address with the "role" that is applicable for device, referred to as "Datapath user entries." Whenever a packet arrives at the Network Access Device, the "datapath user entry" is looked up and the packet is forwarded according to the rules specified by the "role" present in the entry.

Using the improved control plane component and data plane component at the Network Access Device, the system may allocate a Group Identifier Tag (GIT) for each uniquely identifiable group of end user devices. The GIT may identify a grouping of end user devices by, for example, device type (e.g., laptop, camera, IoT device, mobile device, cell phone, administrative computer, or other type of device), device class (e.g., administrator or user), credential (e.g., user or location), location (e.g., building A, building B, or other location), operating system type or version (e.g., Android OS, Apple OS, version 16.1.2, etc.), user or vendor identifier, or other defined grouping of devices or users. The groups of devices may be user-based, device-based, or role-based, among other groupings, and a shared GIT may be assigned to each device in the group. Other groupings may be implemented without diverting from the essence of the disclosure, including any kind of logical grouping that the components of the Network Access Device may be able to identify.

The format of the GIT may vary by implementation (e.g., a 32 bit or 64 bit unsigned integer) and help identify any logical groups of end user devices (e.g., user, location, device type, device class, operating system version, security policy, custom grouping, etc.). The GIT may be encapsulated/added to the data packet by the control plane component or can be learnt from programming associated with a data plane, a control plane, or a central controller. Whenever the end user device connects to the network, the control plane component can identify the "group" to which the end user device belongs and instruct the data plane component to assign the particular GIT that is applicable for the device from the group (e.g., a credential/user name). In this way, a first end user device and a second end user device corresponding with the same logical grouping may be assigned a first GIT and a third end user device that does not correspond with the same logical grouping may be assigned a second GIT. Communications that originate from the first end user device or the second end user device that are transmitted to each other (e.g., corresponding with the same GIT) may be allowed and communications that originate from the first end user device or the second end user device that are transmitted to a third end user device corresponding with the different GIT may be dropped/denied.

In some examples, an administrative user may define additional groups based on some parameters of the end user device. Whenever any packet needs processing, the data plane component looks up the "datapath user entry" for the source address and destination address of the packet. It then gets the "source-role", "destination-role", "source GIT" and "destination GIT" from those datapath user entries. If the "source-role" or "destination-role" have GIT based rules, it then forwards/drops the packet according to those rules.

Technical improvements are realized throughout the disclosure. For example, the disclosed technology can improve data security and scalability throughout the network, at least, by separating authentication from the user and its group of devices. Groups of users and user devices can be identified by the GIT, which can provide separate functionality from the IP address, MAC address, or the role-based access previously assigned to the device/user. This may permit access between a user's multiple devices or multiple devices that are placed at a single location to access services/content from each other and limit the access between users or locations when the groups differ.

FIG. 1 provides an illustrative network access device in communication with other network access devices and user devices via a network, in accordance with some examples of the disclosure. In example 100, network access device 102 comprises processor 104, memory 105, and machine readable media 106. Network access device 102 may store, access, and maintain multiple data stores, including credential data store 120 and group identifier tag (GIT) data store 122. Network access device 102 is in communication with central controller 128, other network access devices 130, and first end user device 132A and second end user device 132B (hereinafter "end user devices 132") via network 140.

Processor 104 may comprise a general-purpose or special-purpose processing engine such as, for example, a microprocessor, controller, or other control logic. Processor 104 may be connected to a bus, although any communication medium can be used to facilitate interaction with other components of network access device 102 or to communicate externally.

Memory 105 may comprise random-access memory (RAM) or other dynamic memory for storing information and instructions to be executed by processor 104. Memory 105 might also be used for storing temporary variables or other intermediate information during execution of instructions to be executed by processor 104. Memory 105 may also comprise a read only memory ("ROM") or other static storage device coupled to a bus for storing static information and instructions for processor 104.

Machine readable media 106 may comprise one or more interfaces, circuits, components, and modules for implementing the functionality discussed herein. Machine readable media 106 may carrying one or more sequences of one or more instructions processor 104 for execution. Such instructions embodied on machine readable media 106 may enable the overall system to perform features or functions of the disclosed technology as discussed herein. For example, the interfaces, circuits, components, and modules of machine readable media 106 may comprise, for example, data processing component 110, control plane component 112, and data plane component 114.

Data processing component 110 is configured to receive and transmit network traffic as data packets. The network traffic may be transmitted from network access device 102 from/to other network access devices 130, or network traffic may be transmitted from network access device 102 from/to end user devices 132.

The contents of the data packets transmitted as network traffic may vary. For example, the format of the data packet may comprise an IPv4 format with a header and a payload. The header of the IPv4 format data packet may consist of fourteen fields, including a source IP address, destination IP address, offset, version, and other information. In another example, the format of the data packet may comprise an IPv6 format with a header and a payload. The header of the IPv6 format data packet may consist of a header and a payload. The header of the IPv6 format data packet may also comprise a source IP address, destination IP address, offset, version, and other information. Various features of the data packet format may be implemented or removed, including implementing error detection in higher-layer protocols for IPv6, e.g., the Transmission Control Protocol (TCP) and the User Datagram Protocol (UDP) on the transport layer. IPv4 may allow UDP datagram headers to have no checksum and IPv6 may require a checksum in UDP datagram headers.

Any of the contents of the data packet may be used as an end user device identifier. For example, the end user device identifier for end user device 132A may be the source IP address of the data packet and the end user device identifier for end user device 132B may be the destination IP address of the data packet.

In some examples, data processing component 110 may receive a credential upon authentication or registration of end user device 132, or may be capable of authenticating or registering end user device 132 on its own. When data processing component 110 receives a credential, central controller 128 may be capable of receiving the credential from end user device 132 and adding it to an approve list or a deny list that may be accessed and implemented at multiple devices that are communicative connected to central controller 128. In some examples, central controller 128 may distribute the GIT to different network access devices 102, 130 or end user devices 132. Central controller 128 may be implemented/executed as a component on a virtual machine (VM) or as a component at network access devices 102, 130 or cloud (not shown). When data processing component 110 is capable of authenticating or registering end user device 132 on its own, data processing component 110 may receive the credential prior to the login attempt, and add it to an approve list or a deny list, without assistance from central controller 128.

Upon authentication/registration of end user device 132, data processing component 110 may compare the credential in the network traffic that is provided at login to the credential stored in the approve list or the deny list. When the credential is included in the approve list, data processing component 110 may permit access of end user device 132. When the credential is included in the deny list, data processing component 110 may deny access of end user device 132. The user credential may be received via a data transmission in a network that communicatively connects network access device 102 with a first end user device 132A and second end user device 132B. The user credential may correspond with a user that operates both first end user device 132A and second end user device 132B.

The credential may be a credential associated with the user, a credential associated with a location of the device, or some other identifying credential to permit authentication of the device/user with the system. For example, the network traffic may comprise a credential associated with the location of the end user device 132. The credential may be received via a data transmission in a network that communicatively connects network access device 102 with a first end user device 132 and second end user device 132. The credential may correspond with a location where both first end user device 132A and second end user device 132B are located, and the two end user devices may be grouped.

Network access device 102 or central controller 128 may permit access to network resources in accordance with the end user device identifier (e.g., the source IP address that is included in the data packet transmitted from end user device 132A). The access to network resources may be permitted in accordance with an access control list (ACLs) that allows authenticated devices to access certain data objects in the network. In some examples, network access device 102 or central controller 128 may assign a role in accordance with role based access controls (RBAC). End user devices 132 may access network resources in accordance with the role assigned to the end user device.

The end user devices and network traffic may comprise a new identifier stored in the transmitted data packets, referred to a Group Identifier Tag (GIT). Data plane component 114 may add/append/encapsulate the GIT to the network traffic using the GIT stored in GIT data store 122, as discussed herein.

Control plane component 112 is configured to authenticate a credential associated with the various end user devices 132. The credential may be received via a data transmission in network 140 that communicatively connects network access device 102 with first end user device 132A and second end user device 132B. For example, the credential may be authenticated by comparing the credential received during the data transmission with the credential stored in credential data store 120 (e.g., which was added during registration of the end user device by central controller or network access device 102).

Control plane component 112 is also configured to group end user devices 132 by a common user or a common location. For example, additional network traffic may be received by control plane component 112 that originates from an end user device that is not previously identified by control plane component 112. Control plane component 112 may identify the end user device associated with the network traffic (e.g., using an end user device identifier like a MAC address or IP address) and associate the network traffic with a particular user (e.g., a second user with a second credential).

Control plane component 112 is configured to allocate a first GIT to first network traffic originating from first end user device 132A. To allocate the GIT to the network traffic, control plane component 112 may generate a new GIT associated with any logical-based grouping (e.g., by device type, device class, credential, location, operating system, user identifier, or other defined grouping of devices or users) that is included with the network traffic data packet. The GIT may be stored in GIT data store 122.

In some examples, the allocation of the GIT to the network traffic is implemented by transmitting the GIT from control plane component 112 of Network Access Device 102 to data plane component 114 of Network Access Device 102.

Data plane component 114 may access GIT data store 122 and search for the logical grouping that matches the network traffic data packet, and determine the matching GIT. The GIT may be added/appended to the network traffic data packet by data plane component 114. In some examples, since control plane component 112 adds the GIT to GIT data store 122 and data plane component 114 accesses GIT data store 122, control plane component 112 may be configured to instruct data plane component 114 to perform tasks upon receiving the data packet (e.g., based on the assigned GIT, role, credential, or other logical grouping).

Data plane component 114 is configured to add/append/encapsulate an existing GIT to new network traffic. For example, data plane component 114 may automatically add/append the first GIT to second network traffic received via network 140 that originates from a particular user (e.g., originating from second end user device 132B). The existing GIT may be added to the new network traffic when the credential of the user is received for second end user device 132B.

When the GIT is encapsulated with the data packet, the encapsulation process may implement various process. For example, network access device 102 may execute a tunneling protocol like Generic Routing Encapsulation (GRE) to encapsulate a network layer protocol inside of virtual point-to-point links or point-to-multipoint links over a transport protocol like the Internet Protocol (IP). In another example, network access device 102 may execute a protocol like Virtual Extensible LAN (VXLAN) to encapsulate an original Ethernet frame inside of a User Datagram Protocol (UDP) packet. The new UDP packet contains both the VXLAN header and the complete original Ethernet header. The encapsulated GIT may be sent in data packet with the network traffic.

Data plane component 114 is also configured to add/append the first GIT to second network traffic received via network 140 and originating from a particular location. The location may be identified by a portion of an IP address or subnet mask. In some example, a location that is similar to known locations may be correlated with existing end user devices 132.

Data plane component 114 is configured to drop network packets received via network 140. For example, data plane component 114 may drop the network packet when the network traffic is being transmitted to a device associated with a first GIT and the network packet comprises a second GIT. When the first GIT is different from the second GIT, the network packet may be dropped. As discussed, the first GIT and second GIT may correspond to different users operating the end user devices 132 or, in some examples, different locations where the end user devices 132 are located or other logical-based grouping discussed herein.

Figure 2:
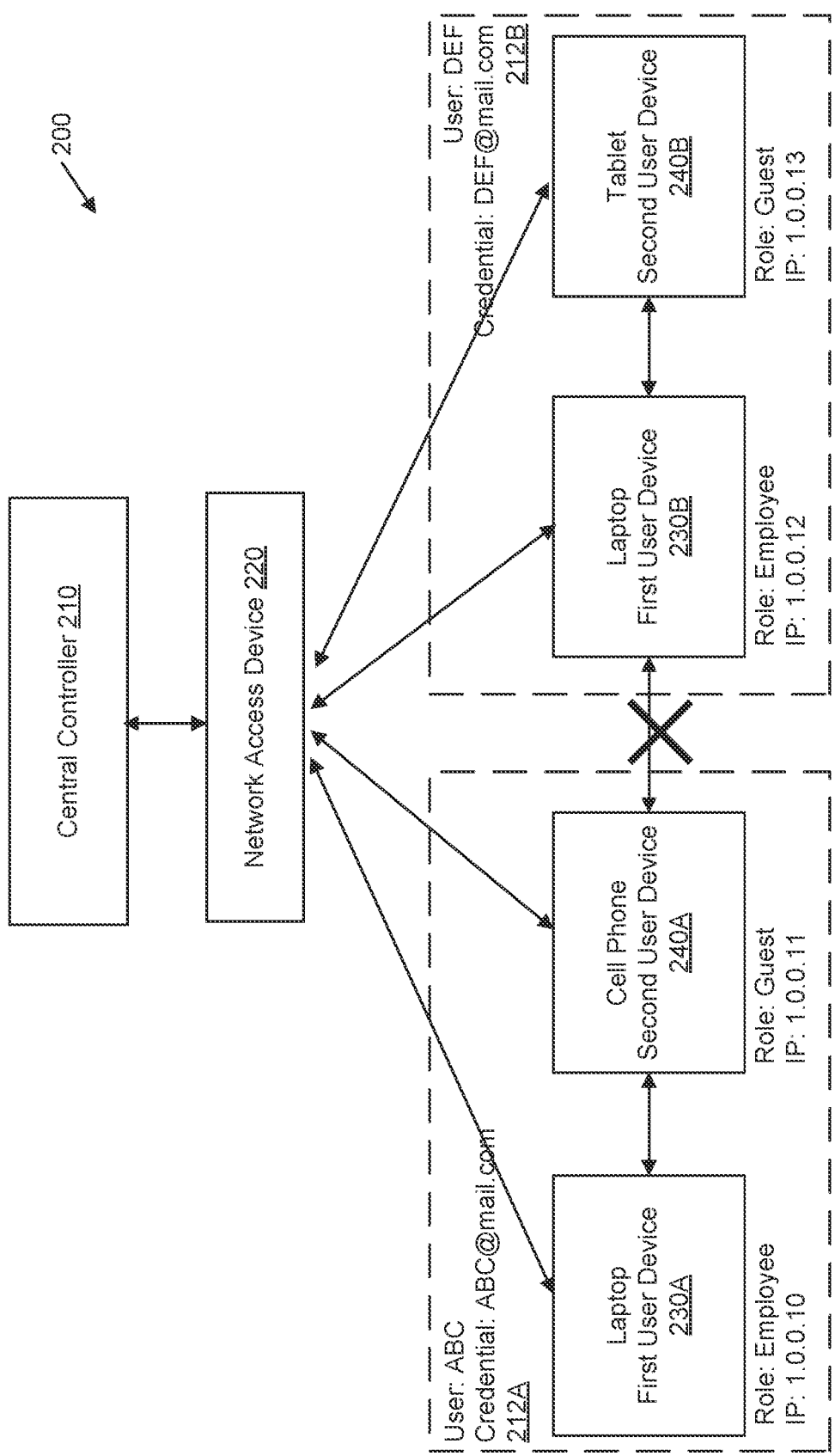
FIG. 2 illustrates user-based grouping of user devices, in accordance with some examples of the disclosure.

FIG. 2 illustrates user-based grouping of user devices, in accordance with some examples of the disclosure. In example 200, central controller 210 is communicatively connected to network access device 220, which is communicatively connected to multiple user devices 230, 240. Network access device 220 and user devices 230, 240 of FIG. 2 may correspond with network access device 102 and end user devices 132 of FIG. 1, respectively.

In example 200, user-based grouping may be implemented. For example, first user 212A (user name "ABC") is associated with first user device 230A and second user device 240A and second user 212B (user name "DEF") is associated with first user device 230B and second user device 240B. Two users are illustrated, each corresponding with a unique credential (credential "ABC@mail.com" for first user 212A and credential "DEF@mail.com" for second user 212B).

Additionally, each of the user devices may be assigned a role using role-based access implemented by central controller 210 or network access device 220. For example, first user device 230A of first user 212A (user name "ABC") is associated with a first role ("employee") and IP address (1.0.0.10). Second user device 240A of first user 212A (user name "ABC") is associated with a second role ("guest") and IP address (1.0.0.11). The device types of these user devices is "laptop" and "cell phone," respectively. In another example, first user device 230B of second user 212B (user name "DEF") is associated with a first role ("employee") and IP address (1.0.0.12). Second user device 240B of second user 212B (user name "DEF") is associated with a second role ("guest") and IP address (1.0.0.13). The device types of these user devices is "laptop" and "tablet," respectively.

Central controller 210 or network access device 220 may be configured to perform policy management, end user authentication, and end user device registration (e.g., to add to the allow list or deny list). In some examples, central controller 210 is configured to orchestrate the GIT across multiple network access devices, such that common user-based access is consistently permitted across each of the network access devices. Network access device 220 is also configured to create the GIT and assign the GIT to the end user devices based on the corresponding credential used to authenticate the device with the network.

FIG. 3 illustrates a memory component of the system for storing a grouping of identifiers to enhance network security of user devices, in accordance with some examples of the disclosure. Example 300 is an illustrative example of the user-based grouping illustrated in example 200 of FIG. 2. In example 300, the data store comprises GIT 310 that has been allocated to a particular role 320, end user device identifier 330, and credential 340 by control plane component of network access device.

In some examples, end user device identifier 330 may correspond with an IP address of a particular end user device. In some implementations, the MAC address and IP address of the end user device may be stored. The data store may comprise other information described herein in relation to the first end user device and the second end user device and corresponding roles in a datapath (e.g., device type, classification, OS version, etc.).

FIG. 4 illustrates a memory component of the system for storing role-based rules to enhance network security of user devices, in accordance with some examples of the disclosure. Example 400 is an illustrative example of the user-based grouping illustrated in example 200 of FIG. 2. In example 400, the data store comprises ID 410, role 420, and rule 430 that may incorporate the GIT allocated for the particular group of end user devices by control plane component of network access device.

Illustrative rules are provided and should not be limiting. For example, for a device assigned a role "employee," the rule may be applied in an order in which they are stored in the data store. The network access device may first allow transmission of the data packet when the role of the device is "employee" and the GIT matches between "any source and destination." The network access device may next allow transmission of the data packet when the role of the device is "employee" and the data traffic is provided to a corporate mail server. The network access device may next allow transmission of the data packet when the role of the device is "employee" and the data traffic is transmitted to the Internet.

In another example, for a device assigned a role "guest," the rule may be applied in an order in which they are stored in the data store. The network access device may first allow transmission of the data packet when the role of the device is "guest" and the GIT matches between "any source and destination." The network access device may next deny any transmission of the data packet when the role of the device is "guest" and the data traffic is provided to a corporate mail server. The network access device may next allow transmission of the data packet when the role of the device is "guest" and the data traffic is transmitted to the Internet.

In these illustrations, different access roles for the end user devices is provided. For example, corporate laptop MAC addresses may be part of a database. End-user devices with MAC addresses from that database may be assigned with "employee" role after successful authentication. Devices whose MAC address does not match, like a user's mobile device with a valid username/password may be assigned "guest" role. In addition to the access roles that are associated with end user devices and through a separate process, the allocation of the GIT may additionally assign network forwarding decisions or other access and communication rights/restrictions for the end user devices. For example, a device with an "employee" role may be enhanced to make network forwarding decisions based on the allocation of the GIT and corresponding grouping. In this sense, the first end user device may forward a communication within its GIT-grouping, but may not forward a communication or access a network resource via the network that is associated with a second GIT-grouping. In other examples, a second end user device may access fewer network resources via the network than the first end user device based on the corresponding role-based access with the additional allocation of the GIT. This can create multiple layers of access and groups for varied permissions in the network through role-based access and separately by allocation of the GIT based on varied groupings.

Figure 5:
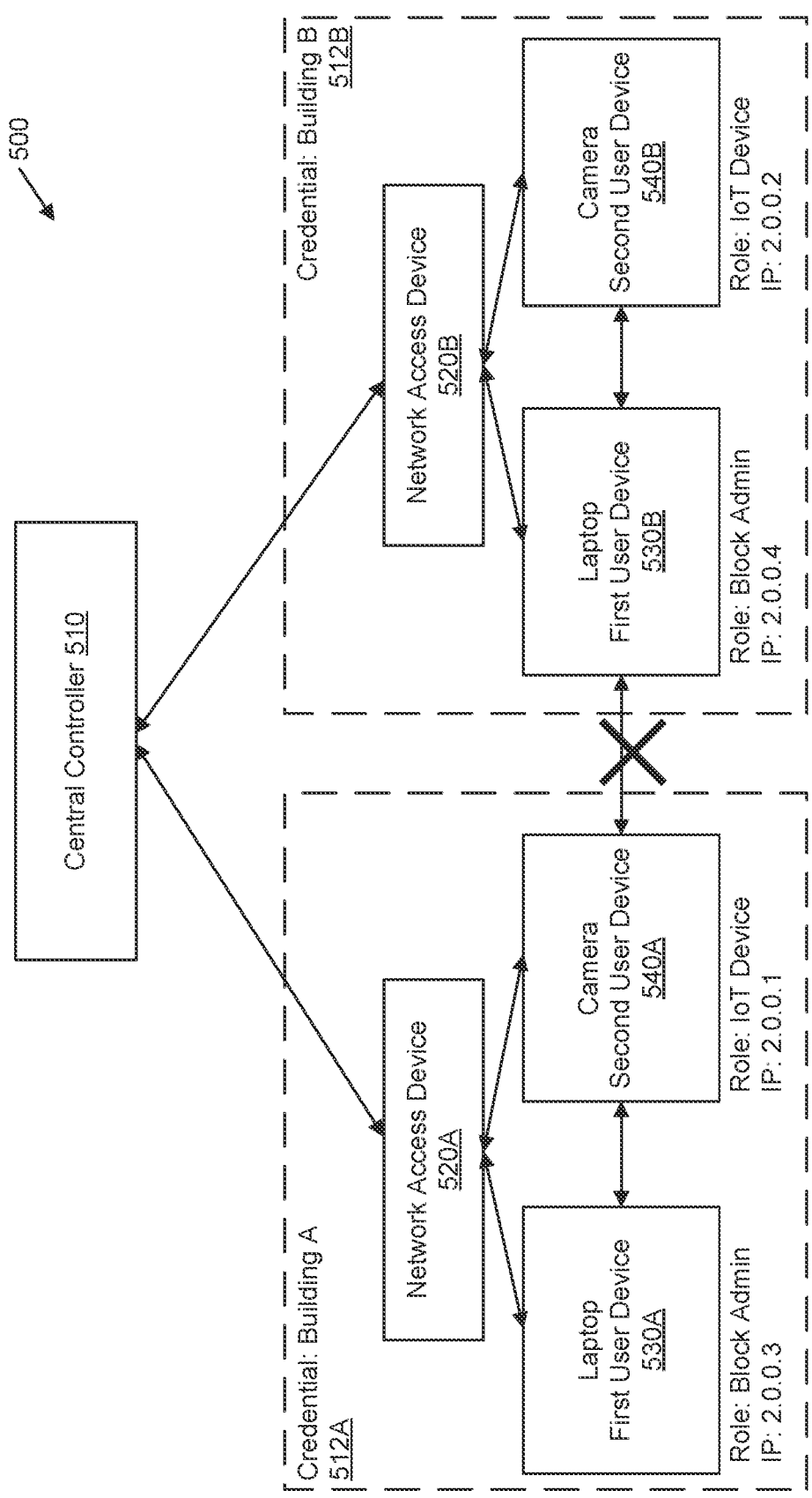
FIG. 5 illustrates location-based grouping of user devices, in accordance with some examples of the disclosure.

FIG. 5 illustrates location-based grouping of user devices, in accordance with some examples of the disclosure. In example 500, central controller 510 is communicatively connected to multiple network access devices 520 in different locations/buildings, including first network device 520A and second network device 520B. First network device 520A is communicatively connected to multiple user devices 530 located in the same location/building, including first user device 530A and second user device 540A. Second network device 520B is also communicatively connected to multiple user devices 530 located in the same location/building, including first user device 530B and second user device 540B. Network access device 520 and user devices 530, 540 of FIG. 5 may correspond with network access device 102 and end user devices 132, respectively.

In example 500, location-based grouping may be implemented. For example, a first location/building is associated with first user device 530A and second user device 540A and a second location/building is associated with first user device 530B and second user device 540B.

For example, first location 512A (location name "Building A") is associated with first network access device 520A, first user device 530A (device type "laptop"), and second user device 540A (device type "camera"). Second location 512B (location name "Building B") is associated with second network access device 520B, first user device 530B (device type "laptop"), and second user device 540B (device type "camera"). Two locations are illustrated, each corresponding with a unique credential (credential "Building A" for first location 512A and credential "Building B" for second location 512B).

Additionally, each of the user devices may be assigned a role using role-based access implemented by central controller 210 or network access device 220. For example, first user device 530A of first location 512A (location name "Building A") is associated with a first role ("Block Admin") and IP address (2.0.0.3). Second user device 540A of first location 512A (location name "Building A") is associated with a second role ("IoT Device") and IP address (2.0.0.1). The device types of these user devices is "laptop" and "camera," respectively. In another example, first user device 530B of second location 512B (location name "Building B") is associated with a first role ("Block Admin") and IP address (2.0.0.4). Second user device 540B of second location 512B (location name "Building B") is associated with a second role ("IoT Device") and IP address (2.0.0.2). The device types of these user devices is "laptop" and "camera," respectively.

Central controller 510 or network access devices 520A, 520B may be configured to perform policy management, end user authentication, and end user device registration (e.g., to add to the allow list or deny list). In some examples, central controller 510 is configured to orchestrate the GIT across multiple network access devices, such that common location-based access is consistently permitted across each of the network access devices. Network access device 520A, 520B is also configured to create the GIT and assign the GIT to the end user devices based on the corresponding credential (location) used to authenticate the device with the network.

FIG. 6 illustrates a memory component of the system for storing a grouping of identifiers to enhance network security of user devices, in accordance with some examples of the disclosure. Example 600 is an illustrative example of the location-based grouping illustrated in example 500 of FIG. 5. In example 600, the data store comprises GIT 610 that has been allocated to a particular role 620, end user device identifier 630, credential 640, and device type 650 by control plane component of network access device.

FIG. 7 illustrates a memory component of the system for storing role-based rules to enhance network security of user devices, in accordance with some examples of the disclosure. Example 700 is an illustrative example of the user-based grouping illustrated in example 500 of FIG. 5. In example 700, the data store comprises ID 710, role 720, and rule 730 that may incorporate the GIT allocated for the particular group of end user devices by control plane component of network access device. Similar rules are illustrated with FIG. 4 and repeated herein.

Figure 8:
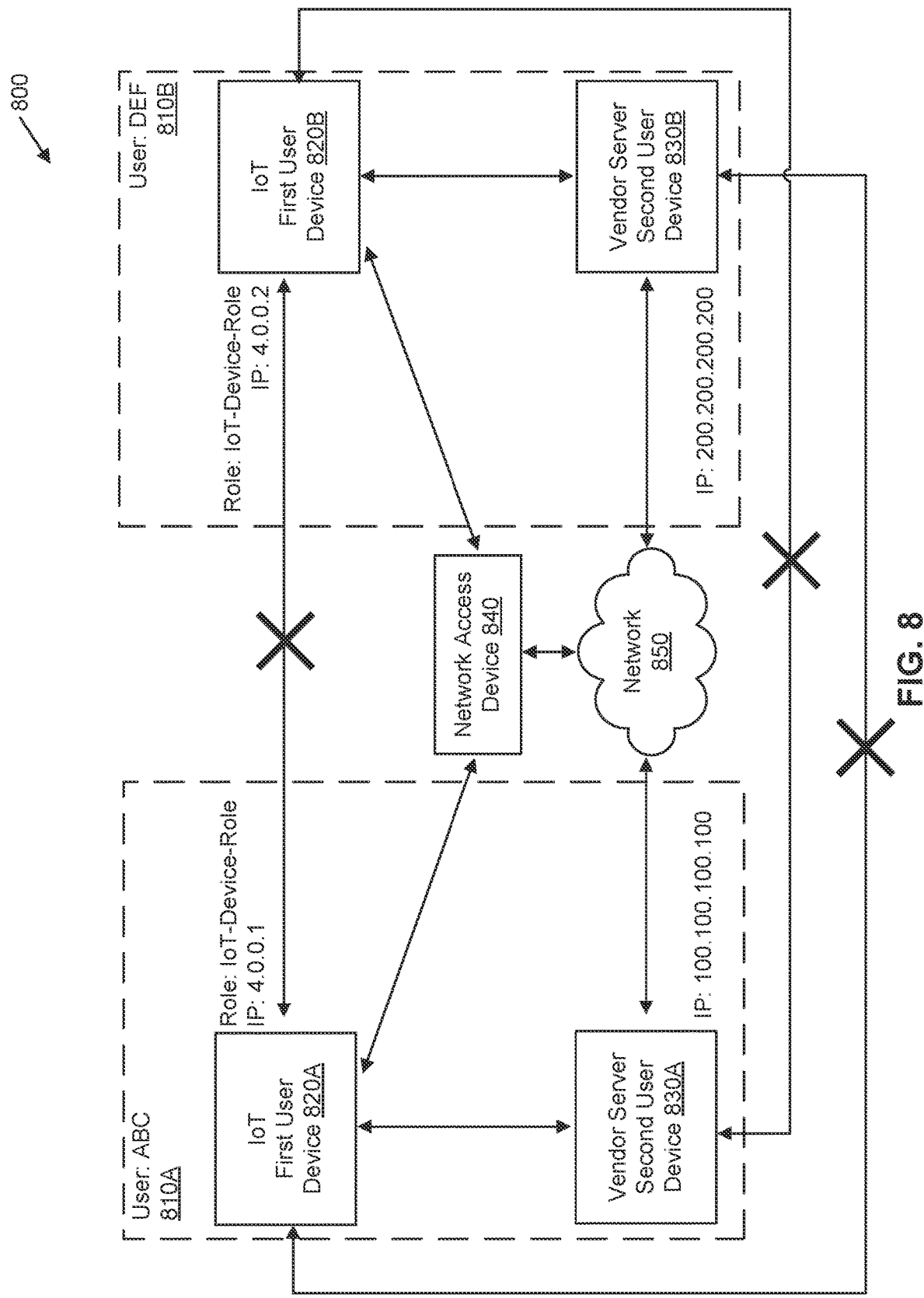
FIG. 8 illustrates a vendor entity grouping of user devices, in accordance with some examples of the disclosure.

FIG. 8 illustrates a vendor entity grouping of user devices, in accordance with some examples of the disclosure. In example 800, a plurality of user vendor entities 810 are illustrated, where a first subset of user devices are communicatively connected to network access device 840 and/or network 850. Network access device 840 and user devices 820, 830 of FIG. 8 may correspond with network access device 102 and end user devices 132 of FIG. 1, respectively.

In example 800, two user vendor entities 810 are illustrated as first user vendor entity 810A (user "ABC") and second user vendor entity 810B (user "DEF"), where a corresponding GIT is assigned to the devices associated with the particular user vendor entity. Associated with each vendor entity 810 is a plurality of user devices, including IoT user device 820 and vendor server user device 830. For example, first user is associated with first IoT user device 820A and first vendor server user device 830A, and second user is associated with second IoT user device 820B and second vendor server user device 830B. IoT user devices 820 may correspond with various devices, including IoT devices, smart electrical appliances, and sensors associated with a particular vendor entity.

First IoT user device 820A may also communicate with first vendor server user device 830A and network access device 840, while only first vendor server user device 830A and network access device 840 may communicate with network 850. Similarly, second IoT user device 820B may communicate with second vendor server user device 830B and network access device 840, while only second vendor server user device 830B and network access device 840 may communicate with network 850.

In example 800, user vendor entity grouping may be implemented. For example, first user vendor entity is associated with first IoT user device 820A and second user vendor entity is associated with second IoT user device 820B. While each user may also be associated with vendor server user device 830, these vendor servers may not access network access device 840 within the restricted communication network. Rather, a subset of the devices associated with the user vendor entity, including first user vendor entity is associated with first IoT user device 820A and second user vendor entity is associated with second IoT user device 820B, may access network access device 840 to access network 850. Separately, each vendor server user device 830 may access the network 850 through communication means that do not use network access device 840.

Additionally, the user devices in the network may be assigned a role using role-based access implemented by network access device 840. For example, first IoT user device 820A of first user 810A (user name "ABC") is associated with a first role ("IoT-Device-Role") and device identifier (IP address: 4.0.0.1), and second IoT user device 820B of second user 810B (user name "DEF") is associated with the same role ("IoT-Device-Role") and device identifier (IP address: 4.0.0.2). Devices outside of this network may also be associated with a device identifier but not a role. For example, first vendor server user device 830A of first user 810A (user name "ABC") is associated with a device identifier (IP address: 100.100.100.100), and second vendor server user device 830B of second user 810B (user name "DEF") is associated with a device identifier (IP address: 200.200.200.200).

In some examples, IoT user devices 820 are connected to network access device 840, which provides connectivity for each IoT user device to access the internet or other network. Vendor server user devices 830 may separately connect to the internet or other network (e.g., not through network access device 840). Network access device 840 may help ensure that IoT user devices 820 only communicate with their respective vendor server user device by using GIT.

Network access device 840 may also be configured to perform policy management, end user authentication, and end user device registration (e.g., to add to the allow list or deny list). Network access device 840 is also configured to create the GIT and assign the GIT to the end user devices based on the corresponding credential used to authenticate the device with the network.

FIG. 9 illustrates a memory component of the system for storing a grouping of identifiers to enhance network security of user devices, in accordance with some examples of the disclosure. Example 900 is an illustrative example of vendor entity grouping of user devices illustrated in example 800 of FIG. 8. In example 900, the data store comprises GIT 910 that has been allocated to a particular role 920 (for a subset of the end user devices), end user device identifier 930, and device type 940.

In some examples, end user device identifier 930 may correspond with an IP address of a particular end user device. In some implementations, the MAC address and IP address of the end user device may be stored. The data store may comprise other information described herein in relation to the first end user device and the second end user device and corresponding roles in a datapath (e.g., device type, classification, OS version, etc.).

In some examples, different access roles for the end user devices is provided. For example, device identifiers associated with first IoT user device 820A and second IoT user device 820B may be part of a database and the end user devices may be assigned with "iot-device-role" role after successful authentication. Devices whose device identifiers does not match, like first vendor server user device 830A of first user 810A and second vendor server user device 830B of second user 810B, may not be authenticated to use the network, so no role is assigned to these devices. In addition to the access roles, the allocation of the GIT may additionally assign network forwarding decisions or other access and communication rights/restrictions for the end user devices.

FIG. 10 provide an illustrative datapath entry, in accordance with some examples of the disclosure. In this example, the data store comprises ID 1010, order 1020, role 1030, and rule 1040 that may incorporate the GIT allocated for the particular group of end user devices by control plane component of network access device. The data store may also comprise instructions corresponding to datapath entries 1050 that are created for devices that correspond with the same GIT to enable communication between them.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 11:
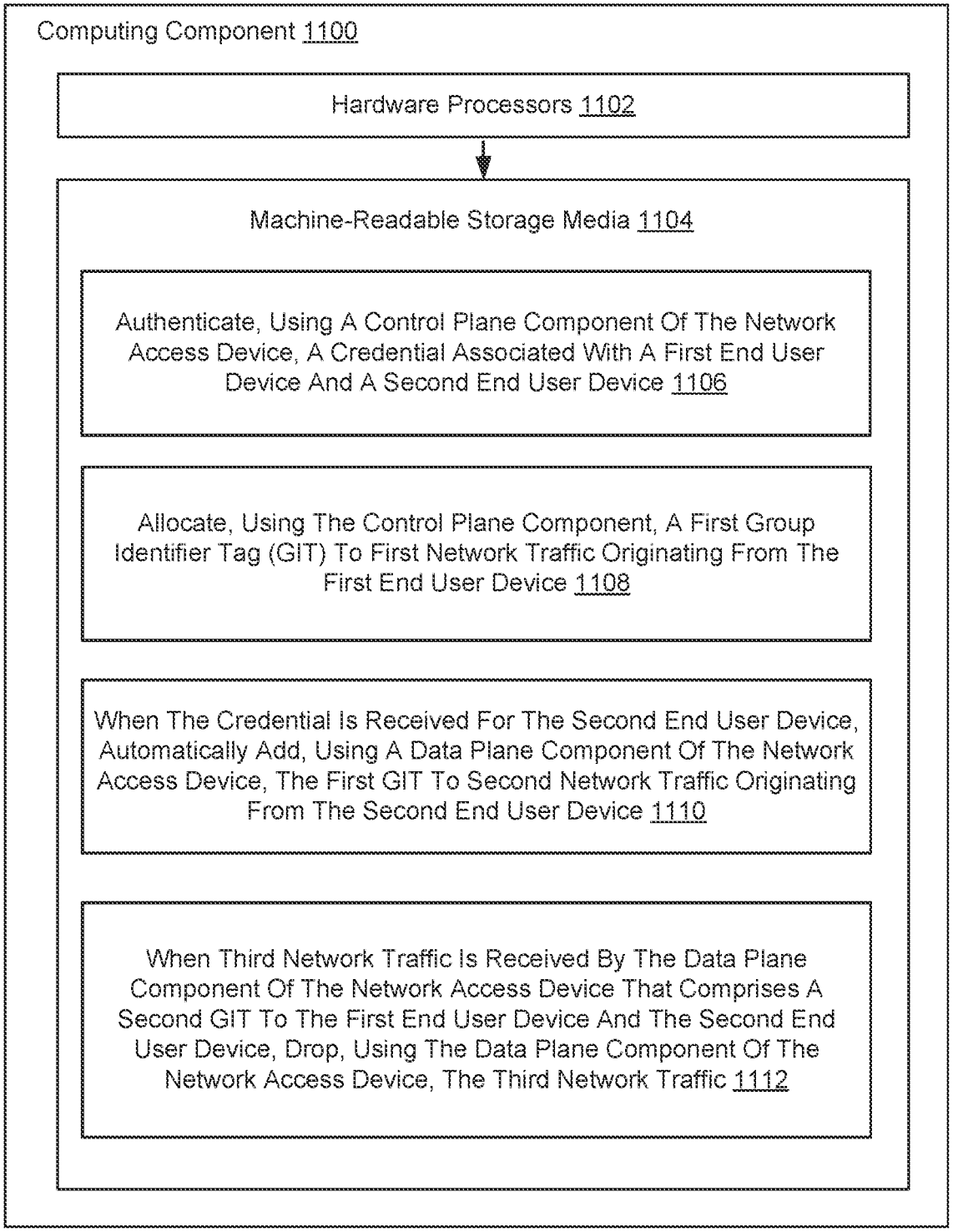
FIG. 11 is an example computing component that may be used to implement various features of examples described in the present disclosure.

FIG. 11 illustrates an example computing component that may be used to implement the dynamically modular and customizable computing systems in accordance with various examples. Referring now to FIG. 11, computing component 1100 may be, for example, a server computer, a controller, or any other similar computing component capable of processing data. In the example implementation of FIG. 11, the computing component 1100 includes a hardware processor 1102, and machine-readable storage medium for 1104.

Hardware processor 1102 may be one or more central processing units (CPUs), semiconductor-based microprocessors, and/or other hardware devices suitable for retrieval and execution of instructions stored in machine-readable storage medium 1104. Hardware processor 1102 may fetch, decode, and execute instructions, such as instructions 1106-1112, to control processes or operations for implementing the dynamically modular and customizable computing systems. As an alternative or in addition to retrieving and executing instructions, hardware processor 1102 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 1104, may be any electronic, magnetic, optical, or other physical storage device that contains or stores executable instructions. Thus, machine-readable storage medium 1104 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 1104 may be a non-transitory storage medium, where the term "non-transitory" does not encompass transitory propagating signals. As described in detail below, machine-readable storage medium 1104 may be encoded with executable instructions, for example, instructions 1106-1112.

Hardware processor 1102 may execute instruction 1106 to authenticate a credential associated with a first end user device and a second end user device. The authentication may be executed using a control plane component of computing component 1100. The credential may be received via a network that communicatively connects computing component 1100 with the first end user device and the second end user device.

Hardware processor 1102 may execute instruction 1108 to allocate a first Group Identifier Tag (GIT) to first network traffic originating from the first end user device the allocation of the first GIT to the first network traffic may be executed using the control plane component of computing component 1100.

Hardware processor 1102 may execute instruction 1110 to automatically add the first GIT to second network traffic originating from the second end user device. The first GIT may be added using a data plane component of computing component 1100. The first GIT may be added when the credential is received for the second end user device.

Hardware processor 1102 may execute instruction 1112 to drop network traffic as well. For example, when third network traffic is received by the data plane component that comprises a second GIT to the first end user device and the second end user device, the network traffic may be dropped. The data plane component of computing component 1100 may drop the network traffic. In some examples, the second GIT may be different than the first GIT, and the second GIT may be allocated to fourth network traffic originating from a third end user device absent an association to the first network traffic, second network traffic, and third network traffic from any of the first end user device and the second end user device.

Figure 12:
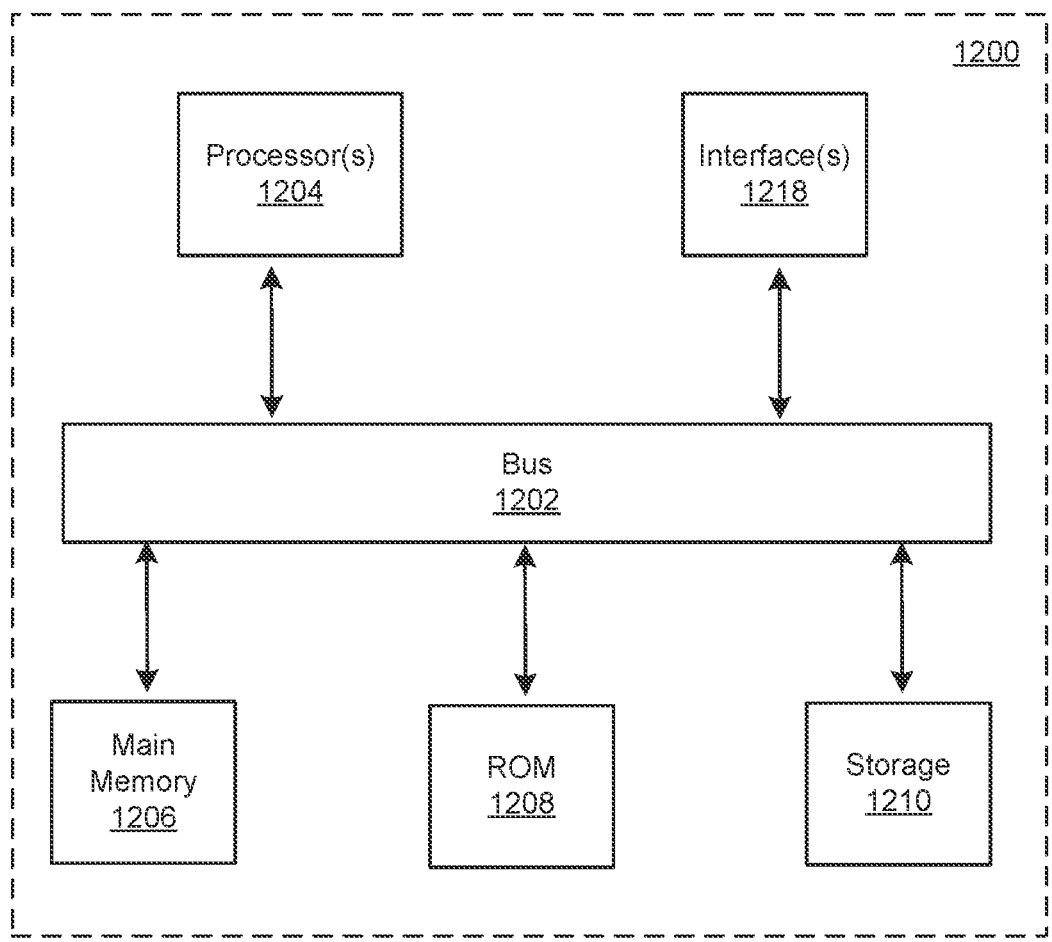
FIG. 12 depicts a block diagram of an example computer system in which various of the examples described herein may be implemented.

FIG. 12 depicts a block diagram of an example computer system 1200 in which various of the examples described herein may be implemented. The computer system 1200 includes a bus 1202 or other communication mechanism for communicating information, one or more hardware processors 1204 coupled with bus 1202 for processing information. Hardware processor(s) 1204 may be, for example, one or more general purpose microprocessors.

The computer system 1200 also includes a main memory 1206, such as a random access memory (RAM), cache and/or other dynamic storage devices, coupled to bus 1202 for storing information and instructions to be executed by processor 1204. Main memory 1206 also may be used for storing temporary variables or other intermediate information during execution of instructions to be executed by processor 1204. Such instructions, when stored in storage media accessible to processor 1204, render computer system 1200 into a special-purpose machine that is customized to perform the operations specified in the instructions.

The computer system 1200 further includes a read only memory (ROM) 1208 or other static storage device coupled to bus 1202 for storing static information and instructions for processor 1204. A storage device 1210, such as a magnetic disk, optical disk, or USB thumb drive (Flash drive), etc., is provided and coupled to bus 1202 for storing information and instructions.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1200 may implement the techniques described herein using customized hard-wired logic, one or more ASICs or FPGAs, firmware and/or program logic which in combination with the computer system causes or programs computer system 1200 to be a special-purpose machine. According to one example, the techniques herein are performed by computer system 1200 in response to processor(s) 1204 executing one or more sequences of one or more instructions contained in main memory 1206. Such instructions may be read into main memory 1206 from another storage medium, such as storage device 1210. Execution of the sequences of instructions contained in main memory 1206 causes processor(s) 1204 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1210. Volatile media includes dynamic memory, such as main memory 1206. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1202. Transmission media can also take the form of acoustic or light waves, such as those generated during radio-wave and infra-red data communications.

The computer system 1200 also includes a communication interface 1218 coupled to bus 1202. Communication interface 1218 provides a two-way data communication coupling to one or more network links that are connected to one or more local networks, including receiving and transmitting network traffic as data packets with a new GIT/identifier stored in the data packets (in coordination with data processing component 110 of network access device 102 illustrated in FIG. 1). For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN (or WAN component to communicated with a WAN). Wireless links may also be implemented. In any such implementation, communication interface 1218 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1218, which carry the digital data to and from computer system 1200, are example forms of transmission media.

The computer system 1200 can send messages and receive data, including program code, through the network(s), network link and communication interface 1218. In the Internet example, a server might transmit a requested code for an application program through the Internet, the ISP, the local network and the communication interface 1218.

The received code may be executed by processor 1204 as it is received, and/or stored in storage device 1210, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A Network Access Device comprising:
   a memory; and
   a processor that is configured to execute machine readable instructions stored in the memory for operating the processor to:
      authenticate, using a control plane component of the Network Access Device, a credential of a user or location associated with a first end user device and a second end user device, the credential being received via a network that communicatively connects the Network Access Device with the first end user device and the second end user device;
      allocate, using the control plane component, a first Group Identifier Tag (GIT) to first network traffic originating from the first end user device;
      when the credential of the user or location is received for the second end user device, automatically add, using a data plane component of the Network Access Device, the first GIT to second network traffic originating from the second end user device; and
      when third network traffic is received by the data plane component of the Network Access Device that comprises a second GIT to the first end user device and the second end user device, drop, using the data plane component of the Network Access Device, the third network traffic, the second GIT being different than the first GIT, and
      the second GIT being allocated to the third network traffic originating from a third end user device, the third end user device being absent from an association to the first network traffic and the second network traffic.

2. The Network Access Device in claim 1, wherein the third network traffic originates from an end user device associated with a second user with a second credential.

3. The Network Access Device in claim 1, wherein the third network traffic originates from a second location outside of a first location comprising the first end user device and the second end user device.

4. The Network Access Device in claim 1, wherein the allocation of the GIT to the first network traffic and the second network traffic is implemented by transmitting the GIT from the control plane component of the Network Access Device to the data plane component of the Network Access Device.

5. The Network Access Device in claim 1, wherein the processor is further to:
   assign, using the control plane component of the Network Access Device, a first access role for the first end user device,
   wherein the allocation of the GIT additionally corresponds with the first access role for the first end user device to access a network resource via the network.

6. The Network Access Device in claim 1, wherein the control plane component is further to:
   program the MAC and IP addresses of the first end user device and the second end user device and corresponding roles in a datapath.

7. The Network Access Device in claim 1, wherein the GIT is a 64 bit unsigned integer.

8. A method comprising:
   authenticating, using a control plane component of a Network Access Device, a credential associated with a first end user device and a second end user device, the credential being received via a network that communicatively connects the Network Access Device with the first end user device and the second end user device;
   allocating, using the control plane component, a first Group Identifier Tag (GIT) to first network traffic originating from the first end user device;
   when the credential of the user or location is received for the second end user device, automatically adding, using a data plane component of the Network Access Device, the first GIT to second network traffic originating from the second end user device; and when third network traffic is received by the data plane component of the Network Access Device that comprises a second GIT to the first end user device and the second end user device, dropping, using the data plane component of the Network Access Device, the third network traffic, the second GIT being different than the first GIT, and the second GIT being allocated to the third network traffic originating from a third end user device, the third end user device being absent from an association to the first network traffic and the second network traffic.

9. The method in claim 8, wherein the third network traffic originates from an end user device associated with a second user with a second credential.

10. The method in claim 8, wherein the third network traffic originates from a second location outside of a first location comprising the first end user device and the second end user device.

11. The method in claim 8, wherein the allocation of the GIT to the first network traffic and the second network traffic is implemented by transmitting the GIT from the control plane component of the Network Access Device to the data plane component of the Network Access Device.

12. The method in claim 8, further comprising:
assigning, using the control plane component of the Network Access Device, a first access role for the first end user device,
wherein the allocation of the GIT additionally corresponds with the first access role for the first end user device to access a network resource via the network.

13. The method in claim 8, further comprising:
programming the MAC and IP addresses of the first end user device and the second end user device and corresponding roles in a datapath.

14. The method in claim 8, wherein the GIT is a 64 bit unsigned integer.

15. A non-transitory computer-readable storage medium storing a plurality of instructions executable by a processor, that when executed by the processor, cause the processor to:
authenticate, using a control plane component of the Network Access Device, a credential of a user or location associated with a first end user device and a second end user device, the credential being received via a network that communicatively connects the Network Access Device with the first end user device and the second end user device;
allocate, using the control plane component, a first Group Identifier Tag (GIT) to first network traffic originating from the first end user device;

when the credential of the user or location is received for the second end user device, automatically add, using a data plane component of the Network Access Device, the first GIT to second network traffic originating from the second end user device; and when third network traffic is received by the data plane component of the Network Access Device that comprises a second GIT to the first end user device and the second end user device, drop, using the data plane component of the Network Access Device, the third network traffic, the second GIT being different than the first GIT, and the second GIT being allocated to the third network traffic originating from a third end user device, the third end user device being absent from an association to the first network traffic and the second network traffic.

16. The non-transitory computer-readable storage medium in claim 15, wherein the third network traffic originates from an end user device associated with a second user with a second credential.

17. The non-transitory computer-readable storage medium in claim 15, wherein the third network traffic originates from a second location outside of a first location comprising the first end user device and the second end user device.

18. The non-transitory computer-readable storage medium in claim 15, wherein the allocation of the GIT to the first network traffic and the second network traffic is implemented by transmitting the GIT from the control plane component of the Network Access Device to the data plane component of the Network Access Device.

19. The non-transitory computer-readable storage medium in claim 15, wherein the instructions further cause the processor to:
assign, using the control plane component of the Network Access Device, a first access role for the first end user device,
wherein the allocation of the GIT additionally corresponds with the first access role for the first end user device to access a network resource via the network.

20. The non-transitory computer-readable storage medium in claim 15, wherein the instructions further cause the processor to:
program the MAC and IP addresses of the first end user device and the second end user device and corresponding roles in a datapath.

* * * * *